(12) United States Patent
Dhaliwal et al.

(10) Patent No.: US 9,350,987 B2
(45) Date of Patent: May 24, 2016

(54) VIDEO QUALIFICATION DEVICE, SYSTEM, AND METHOD

(71) Applicant: CenturyLink Intellectual Property LLC, Denver, CO (US)

(72) Inventors: Ronnie S. Dhaliwal, Centennial, CO (US); Steven M. Casey, Littleton, CO (US); Kevin M. McBride, Lone Tree, CO (US); Felipe Castro, Erie, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 14/519,368

(22) Filed: Oct. 21, 2014

(65) Prior Publication Data

US 2015/0035997 A1    Feb. 5, 2015

Related U.S. Application Data

(63) Continuation of application No. 14/159,314, filed on Jan. 20, 2014, now Pat. No. 8,896,707.

(60) Provisional application No. 61/809,114, filed on Apr. 5, 2013.

(51) Int. Cl.
| | |
|---|---|
| *H04N 17/00* | (2006.01) |
| *H04N 21/258* | (2011.01) |
| *H04N 21/442* | (2011.01) |

(Continued)

(52) U.S. Cl.
CPC ........... *H04N 17/004* (2013.01); *H04N 21/258* (2013.01); *H04N 21/44209* (2013.01); *H04N 21/4882* (2013.01); *H04N 21/6582* (2013.01)

(58) Field of Classification Search
CPC ...................................................... H04N 17/00
USPC ................................................... 348/192, 193
See application file for complete search history.

(56) References Cited

U.S. PATENT DOCUMENTS

| | | |
|---|---|---|
| 8,561,122 B2 | 10/2013 | Kirk et al. |
| 8,896,707 B2 | 11/2014 | Dhaliwal et al. |

(Continued)

OTHER PUBLICATIONS

U.S. Appl. No. 14/159,314; Non-Final Rejection dated Apr. 11, 2014; 14 pages.

(Continued)

*Primary Examiner* — Paulos M Natnael
(74) *Attorney, Agent, or Firm* — Swanson & Bratschun, L.L.C.

(57) ABSTRACT

Novel tools and techniques are provided for implementing video qualification, which might include implementing video quality measurements at a subscriber premises and qualification of the subscriber premises for particular levels of video data transmission. In some cases, one or more customer premises equipment might comprise video quality chips that might perform measurements of the telecommunications links, and might send the results to a server associated with the service provider. The server might determine available video services, based on the results of the measurements, and might send the subscriber notifications indicating that the subscribers qualify for particular video services. In some cases, implementing video qualification might include the server determining that video service levels provided to a customer premises has been decreased or otherwise negatively affected. The server might order diagnosis and repairs of the affected equipment, and might send a notification to the subscriber indicating that repairs are underway.

17 Claims, 8 Drawing Sheets

(51) Int. Cl.
  *H04N 21/488* (2011.01)
  *H04N 21/658* (2011.01)

(56) References Cited

U.S. PATENT DOCUMENTS

| | | | | |
|---|---|---|---|---|
| 2006/0031469 A1* | 2/2006 | Clarke | H04L 29/06027 | 709/224 |
| 2006/0245364 A1* | 11/2006 | Zhu | H04M 3/2236 | 370/241 |
| 2007/0107034 A1* | 5/2007 | Gotwals | H04H 20/12 | 725/129 |
| 2009/0013398 A1* | 1/2009 | Cookmeyer, II | H04L 12/2697 | 726/11 |
| 2010/0053337 A1* | 3/2010 | Kirk | H04N 17/045 | 348/181 |
| 2010/0180314 A1* | 7/2010 | Kim | H04N 7/17318 | 725/110 |
| 2012/0140641 A1* | 6/2012 | Reese | H04L 43/50 | 370/245 |
| 2014/0300757 A1* | 10/2014 | Dhaliwal | H04N 17/004 | 348/192 |

OTHER PUBLICATIONS

U.S. Appl. No. 14/159,314; Notice of Allowance dated Jul. 24, 2014; 14 pages.
U.S. Appl. No. 14/159,314; Issue Notification dated Nov. 5, 2014; 1 page.

* cited by examiner

VIDEO QUALIFICATION DEVICE, SYSTEM, AND METHOD

CROSS-REFERENCES TO RELATED APPLICATIONS

This application is a continuation application of U.S. patent application Ser. No. 14/159,314 (the "'314 application"), filed Jan. 20, 2014, by Ronnie S. Dhaliwal et al., entitled, "Video Qualification Device, System, and Method," which claims priority to U.S. Patent Application Ser. No. 61/809,114 (the "'114 application"), filed Apr. 5, 2013, by Ronnie S. Dhaliwal et al., entitled, "Video Qualification Device," the entire disclosure of each is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a device, system, and method for implementing video qualification, and, more particularly, to a device, system, and method for implementing video quality measurements at a customer premises and qualification of the customer premises for particular levels of video data transmission.

BACKGROUND

Today, specialized equipment must be installed at the customer premises in order to test if video, and what level of video quality, can be delivered to that location. This requires specialized equipment and a trained technician to make multiple visits to the location to test whether the location qualifies for video services.

Hence, there is a need for more robust and scalable video qualification solutions.

BRIEF SUMMARY

Various embodiments provide techniques for implementing video qualification and/or implementing video quality measurements at a customer premises and qualification of the customer premises for particular levels of video data transmission.

According to some embodiments, a system might provide a method for measuring the video quality levels at a customer's premises (either the customer's home or business premises). The video qualification system might gather data about the quality of the data feed and what level of video it could support.

In some cases, this system might utilize a system on a chip ("SOC") that may be added to existing customer premises equipment ("CPE"), such as a network interface device ("NID"), an optical network terminal ("ONT"), a modem, or other device that could be easily installed at the customer premises (typically on an exterior wall thereof). This device might be set-up to monitor the quality of data and quality of data transmission at the customer premises, and then report it back to a monitoring system to identify homes that qualify for particular levels of video services. By doing so, no special equipment needs to be installed to qualify locations for video services. The system could also reduce cost because it would be common in most, if not all, CPE.

The tools provided by various embodiments include, without limitation, methods, systems, and/or software products. Merely by way of example, a method might comprise one or more procedures, any or all of which might be executed by a computer system. Correspondingly, an embodiment might provide a computer system configured with instructions to perform one or more procedures in accordance with methods provided by various other embodiments. Similarly, a computer program might comprise a set of instructions that are executable by a computer system, or by a processor located in the computer system, to perform such operations. In many cases, such software programs are encoded on physical, tangible, and/or non-transitory computer readable media. Such computer readable media might include, to name but a few examples, optical media, magnetic media, and the like.

In an aspect, a method might be provided for implementing video qualification. The method might comprise initiating, by a premises-based device associated with one or more subscribers of a service provider, video quality tests of one or more telecommunications links between the premises-based device and a video distribution system associated with the service provider. The method might further comprise sending, by the premises-based device, results of the video quality tests of the one or more telecommunications links to the service provider over a network. The method might also comprise receiving, by a server associated with the service provider, the results of the video quality tests of the one or more telecommunications links sent by the premises-based device over the network. Thereafter, the method might comprise determining, by the server, video quality levels supportable by each of the one or more telecommunications links.

In some embodiments, the premises-based device might comprise one or more of at least one user device, a modem, a residential gateway device, a network interface device ("NID"), or an optical network terminal ("ONT"). The at least one user device might comprise one or more devices selected from a group consisting of a tablet computer, a smart phone, a mobile phone, a gaming console, a portable gaming system, a desktop computer, a laptop computer, a television set, a set top box, and a portable video playback device. In some instances, the video quality tests might comprise one or more of a signal-to-noise ratio ("SNR") test, a bit error rate ("BER") test, a bandwidth test, or a simulated mean opinion score ("MOS") test, or any other suitable or similar video quality measurement method or test, and/or the like.

According to some embodiments, the method might further comprise determining, by the server, which one or more video services of a plurality of video services are available to the one or more subscribers associated with the premises-based device, based on the determined video quality levels supportable by each of the one or more telecommunications links. The method might comprise sending, by the server, a notification to the one or more subscribers associated with the premises-based device indicating that the one or more video services are available to the one or more subscribers. Sending, by the server, a notification to the one or more subscribers associated with the premises-based device indicating that the one or more video services are available to the one or more subscribers might include sending the notification to the premises-based device. The method might also comprise providing, by the server, information to the one or more subscribers indicating a process for subscribing to the one or more video services available to the one or more subscribers. Providing, by the server, information to the one or more subscribers indicating a process for subscribing to the one or more video services available to the one or more subscribers might include sending the information to the premises-based device. In some cases, the method might comprise sending, by the server, at least one message to the service provider indicating that a corresponding location associated with each of the one or more subscribers qualifies for the one or more video services. The method might further comprise receiving, by the server, an order, from the one or more subscribers, for at least one of the one or more video services, and instructing, by the server, the video distribution system to deliver the at least one of the one or more video services to the premises-based device associated with the one or more subscribers, in response to receiving the order.

In some cases, the method might comprise comparing, by the server, the determined video quality levels supportable by each of the one or more telecommunications links with previously determined and stored video quality levels supportable by each of the one or more telecommunications links. The method might further comprise, based on a determination that the video quality levels have decreased by a predetermined amount for at least one of the one or more telecommunications links, sending, by the server, at least one of a work order to a technician to diagnose and repair problems associated with the at least one of the one or more telecommunications links or a message to the one or more subscribers associated with the premises-based device indicating that a technician will soon arrive to diagnose and fix a problem associated with the at least one of the one or more telecommunications links.

In another aspect, a system for implementing video qualification might be provided. The system might comprise a premises-based device associated with one or more subscribers of a service provider and a server associated with the service provider. The premises-based device might comprise one or more first processors configured to initiate video quality tests of one or more telecommunications links between the premises-based device and a video distribution system associated with the service provider, and to send results of the video quality tests of the one or more telecommunications links to the service provider over a network. The server might comprise one or more second processors configured to receive the results of the video quality tests of the one or more telecommunications links sent by the one or more first processors of the premises-based device over the network, and to determine video quality levels supportable by each of the one or more telecommunications links.

In yet another aspect, an apparatus for implementing video qualification might be provided. The apparatus might comprise one or more processors and a non-transitory computer readable medium. The non-transitory computer readable medium might have stored thereon software comprising a set of instructions that, when executed by the one or more processors, causes the apparatus to perform one or more functions. The set of instructions might comprise instructions to receive results of video quality tests of one or more telecommunications links between a premises-based device associated with one or more subscribers of a service provider and a video distribution system associated with the service provider. The set of instructions might further comprise instructions to determine video quality levels supportable by each of the one or more telecommunications links.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
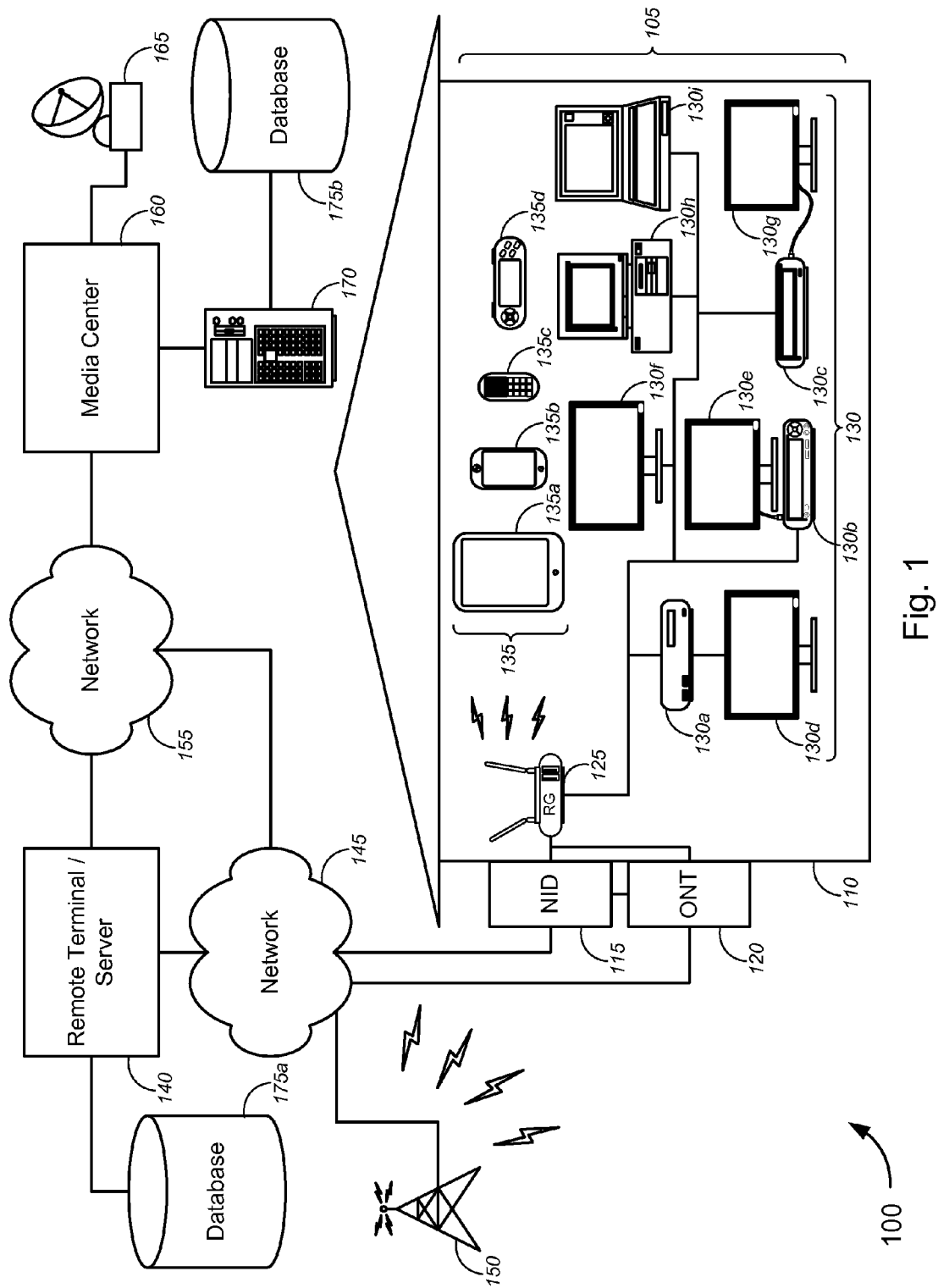
FIG. 1 is a general schematic diagram illustrating a system for implementing video qualification, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide techniques for implementing video qualification and/or implementing video quality measurements at a customer premises and qualification of the customer premises for particular levels of video data transmission.

According to some embodiments, a system might provide a method for measuring the video quality levels at a customer's premises (either the customer's home or business premises). The video qualification system might gather data about the quality of the data feed (or communication lines), by, for example, testing video quality (including determining signal-to-noise ratios ("SNR"), bit-error-rates ("BER"), mean-opinion scores ("MOS"), simulated MOS, and/or the like), testing bandwidth to a user device within a local area network ("LAN"), testing bandwidth between the LAN and the Internet or service provider network, or the like. According to some embodiments, a system on a chip ("SOC") type video qualification chip might receive video traffic (video data) from the network and then calculate the SNR, BER, MOS, and/or the like. This might be a background process performed on the chip. This process can be used either to pre-qualify a video subscriber before he or she has ordered the service, or as a post offering after the subscriber has started using the service to let a service provider know how well the video is being delivered. Based on these performance metrics, the service provider can fine tune its video offering. In some embodiments, the service provider can send down test video streams to the device and then measure the results. These could be sent down on a predefined interval (including, but not limited to, every 1, 2, 3, 4, 5, 6 hours, or the like), or sent down at random times (including, without limitation, 2, 3, 4, 5, 6 times per day, or the like) to see how the device performs. These testing intervals may be set up in a backend system defined by the service provider. Alternatively, or in addition, the test chips could start at low bandwidth levels like 500 Kbps stream and then keep stepping up to 20 Mbps (e.g., in increments of 100, 200, 300, 400, 500 Kbps, or the like; or might step up based on the bandwidth levels shown, e.g., in Table 1 below) to see how the connection performs. Then, based on these levels the optimal video bandwidth level could be determined.

The video qualification system might gather data about what level of video it could support (including, without limitation, digital television ("DTV") levels, high-definition television ("HDTV") levels, and ultra-high-definition television ("UHDTV") levels, or the like). According to some embodiments, the data might be gathered in Megabits per second or a similar metric so that the service provider can then determine what level of video would be offered. This might include peak, sustained, and average Mbps over time. The following table illustrates example video testing levels, corresponding bandwidth levels, performance levels, and error rates (including, e.g., BER, SNR, MOS, etc.), each of which is provided merely for purposes of illustration, and are in no way limited to the values shown).

TABLE 1

Example Video Testing Levels

| Video Level | Bandwidth Level | Performance | Errors (BER, SNR, etc.) |
|---|---|---|---|
| VL-1 | 500 Kbps | Pass | 0% |
| VL-2 | 1 Mbps | Pass | 0% |
| VL-3 | 3 Mbps | Pass | 0% |
| VL-4 | 5 Mbps | Pass | 5% |
| VL-5 | 10 Mbps | Pass | 7% |
| VL-6 | 20 Mbps | Fail | 70% |

Herein, "DTV levels" might refer to 480 line resolution (i.e., 480 visible scanlines out of 525 lines, based upon National Television System Committee ("NTSC") standards) or 576 line resolution (i.e., 576 visible scanlines out of 625 lines, based upon phase alternating line ("PAL")/Sequential Color with Memory ("SECAM") standards) video. "HDTV levels" might refer to 720 or 1080 line resolution. For 720 line resolution, the frame size is 1,280×720 pixels, and is a progressive scan type, with frame rates that include one of 23.976, 24, 25, 29.97, 30, 50, 59.94, 60, or 72 Hz. For 1080 line resolution, the frame size is 1,920×1,080 pixels, and is one of progressive or interlaced scan type, with frame rates that include one of 25 (50 fields/s), 29.97 (59.94 fields/s), or 30 (60 fields/s) for interlaced scanning, and that include one of 24, 25, 30, 50, or 60 Hz for progressive scanning. For "progressive scanning (p)," an image frame with all of its lines are redrawn when refreshing each image, while, for "interlaced scanning (i)," odd-numbered lines are redrawn during a first image refresh operation, while even-numbered lines are redrawn during a second image refresh operation.

"UHDTV levels" might include, without limitation, 2000, 2160, 2540, 4000, 4320, or greater line resolution, which might have frame sizes of 2,048×1,536 pixels, 3,840×2,160 pixels, 4,520×2,540 pixels, 4,096×3,072, or 7,680×4,320 pixels, respectively, and are all typically progressive scan type. For 2000 line resolution, the frame rate is 24 Hz, while the frame rates for each of the 2160 and 4320 line resolution include one of 60 or 120 Hz.

In some cases, this system might utilize a system on a chip ("SOC") that may be added to existing customer premises equipment ("CPE"), such as a network interface device ("NID"), an optical network terminal ("ONT"), a modem, and/or other device that could be easily installed at the customer premises (typically on an exterior wall thereof). This device might be set-up to monitor the quality of data and quality of data transmission at the customer premises, and then report it back to a monitoring system to identify homes that qualify for particular levels of video services. By doing so, no special equipment needs to be installed to qualify locations for video services. The system could also reduce cost because it would be common in most, if not all, CPE.

Further, because the system would be common to most, if not all, CPE, users who are not yet subscribers of service providers can have their premises (and the communications links between their premises and the service provider's media center) tested to determine whether the premises qualify for video services and which levels of video services are available for the premises, and notifications can be sent by the service provider or a third party (e.g., a clearinghouse, a promotions entity, or the like) to these potential customers to indicate that they qualify for certain levels of video services.

In some embodiments, periodic testing of the data feed (or communication lines) of existing customers' premises can identify reductions in video service quality. When such reductions are identified, the system can automatically remotely diagnose and fix the problem over the network and/ or automatically generate work orders to send technicians to diagnose and fix the problem. The system can also concurrently send notifications to the users (or subscribers) to indicate that the problem has been identified and that the problem is being taken care of remotely and/or that a technician has been sent to diagnose and fix the problem.

We now turn to the embodiments as illustrated by the drawings. FIGS. 1-8 illustrate some of the features of the method, system, and apparatus for implementing video qualification and/or implementing video quality measurements at a customer premises and qualification of the customer premises for particular levels of video data transmission, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a general schematic diagram illustrating a system 100 for implementing video qualification, in accordance with various embodiments. In FIG. 1, system 100 might comprise one or more customer premises equipment ("CPE") 105 located in or at a customer premises 110. The one or more CPE 105 might comprise a network interface device ("NID") 115, an optical network terminal ("ONT") 120, a modem or residential gateway ("RG") 125, one or more user devices 130. The one or more user devices 130 might comprise gaming console 130a, digital video recording and playback device ("DVR") 130b, set-top or set-back box ("STB") 130c, one or more television sets ("TVs") 130d-130g, desktop computer 130h, laptop computer 130i, and one or more mobile user devices 135. The one or more TVs 130d-130g might include any combination of a high-definition ("HD") television, an Internet Protocol television ("IPTV"), and a cable television, or the like, where one or both of HDTV and IPTV may be interactive TVs. The one or more mobile user devices 135 might comprise one or more tablet computers 135a, one or more smart phones 135b, one or more mobile phones 135c, or one or more portable gaming devices 135d, and/or the like.

System 100 might further comprise a remote terminal or server 140 communicatively coupled to one or more CPEs 105 via network 145 (which might be an access network), and in some cases via one or more telecommunications relay systems 150. The one or more telecommunications relay systems 150 might include, without limitation, one or more wireless network interfaces (e.g., wireless modems, wireless access points, and the like), one or more towers, one or more satellites, and the like. System 100 might further comprise network 155 (which might include, but is not limited to, a service provider network, a wide area network ("WAN"), the Internet, or other suitable network, and the like), media center or media distribution center 160, media content receiver 165, media content server 170, one or more databases 175. The one or more databases 175 might include a database 175a local to the remote terminal 140 or a database local to the media center 160 or media content server 170. In some embodiments, remote terminal 140—with database 175a communicatively coupled thereto—might be communicatively coupled directly to only network 145, and indirectly to network 155 via network 145. In other instances, remote terminal 140 might be communicatively coupled directly to both networks 145 and 155. Media center 160—which is communicatively coupled to network 155—might be communicatively coupled directly to each of media content receiver 165 and video content server 170. Database 175b might be communicatively coupled directly to video content server 170.

In operation, at least one of the CPEs 105 might monitor and measure the quality of data received, as well as the quality of data transmission, at the customer premises 110, which might include monitoring and measuring signal-to-noise ratios ("SNR"), bit-error-rates ("BER"), mean-opinion scores ("MOS"), simulated MOS, bandwidth to a user device within a local area network ("LAN") within the customer premises 110, bandwidth between the LAN and the networks 145 and/or 155, or the like. The measurements and data gathered by the at least one of the CPEs 105 are then sent to the remote terminal 140 via network 145 and NID 115 or ONT 120 (and in some cases, via the one or more telecommunications relay systems 150) either wirelessly or via wired connections, or both.

The remote terminal 140 might determine, based on the received measurements and data, whether the customer premises 110 (and the telecommunications lines leading to the customer premises 110) qualify for a particular level of video service (e.g., one or more of DTV, HDTV, or UHDTV levels). In some embodiments, because video compression is constantly changing and offering better quality at lower bandwidths (e.g., lower Mbps speeds, or the like), such determination might include measuring the bandwidth, and the performance metrics at those measured bandwidths (including, without limitation, SNR, BER, MOS, and/or the like). An example of error levels (i.e., performance metrics) at which performance is deemed to pass or fail is shown, e.g., in Table 1 above (which is provided merely for purposes of illustration, and is not intended to limit the type of video levels, bandwidth levels, performance levels, and/or error levels, or the values or metrics associated therewith). If it is determined that the customer premises 110 (and the telecommunications lines leading to the customer premises 110) qualify for a particular level of video service, the remote terminal 140 might determine whether the customer premises 110 already receives video services at one of these particular levels of video service. If so, the remote terminal 140 might determine if the customer premises 110 already receives the highest level of video services among these particular levels of video service. If not, the remote terminal 140 might generate a notification indicating that the user or customer associated with the customer premises 110 qualifies for an upgrade to his or her video services, and might send the notification to one or more user devices 130 associated with the user or customer (or associated with the customer premises 110).

The notification might provide the user or customer with options to find out more about the available video services or upgrades, and/or provide options to upgrade video services, by following links included in the notification and/or calling customer service telephone numbers also included in the notification.

In the case that the user or customer opts to upgrade video services, the remote terminal 140 might automatically send instructions to media center 160 via network 155 (and, in some cases, also via network 145) to begin providing the upgraded video services to the CPEs 105 at customer premises 110, and to update the user's or customer's account within database 175a to reflect the upgrade in video services (and to update billing information associated with the user and/or the customer premises 110). Media center 160 might receive video content via media content receiver 165, from media content server 170, and/or from database 175b to broadcast, stream, or otherwise transmit requested video content to the CPEs 105 at customer premises 110. The requested video content, in some embodiments, might include on-demand video content or broadcast video content, both at the upgraded video service levels (e.g., HDTV levels or UHDTV levels).

According to some embodiments, the at least one of the CPEs 105 might continue to monitor and measure the quality of data received, as well as the quality of data transmission, at the customer premises 110—including monitoring and measuring SNR, BER, MOS, simulated MOS, bandwidth to a user device within the LAN (within the customer premises 110), bandwidth between the LAN and the networks 145 and/or 155, or the like. The measurements and data are also sent to the remote terminal 140 via network 145 and NID 115 or ONT 120 (and in some cases, via the one or more telecommunications relay systems 150) either wirelessly or via wired connections, or both.

The remote terminal 140—which periodically stores such measurements and data, e.g., in database 175a—might also periodically compare the newly received measurements and data with previously stored measurements and data for the customer premises 110 (and the telecommunications lines linking to the customer premises 110). Based on a determination that the video quality levels have decreased, the remote terminal 140 might send a work order to one or more technicians to diagnose and repair the problems associated with the telecommunications lines, service provider equipment, and/or CPEs accessible by the service provider (i.e., CPEs mounted to an exterior wall of the customer premises 110, including, without limitation, NID 115 and ONT 120), or the like. In some cases, if it is determined by remote terminal 140 that more than one customer premises 110 suffer concurrent decreases in video service levels, the remote terminal 140 might apply diagnostic algorithms to determine whether a common problem exists. For example, if a number of customer premises 110 that are connected to the same digital subscriber line access multiplexer ("DSLAM"), then it may be determined that the problem might lie with the DSLAM or service provider equipment upstream of the DSLAM (i.e., from the media center 160 to the DSLAM, etc.). If it is determined that the only customer premises 110 affected are ones with HDTV level or UHDTV level video service subscriptions, then it may be determined that bandwidth of one or more telecommunications paths or links leading to the affected customer premises 110 might be at issue.

Concurrent with sending the work order to the one or more technicians, the remote terminal 140 might also send notifications to users or customers of the affected customer premises 110 indicating that the service provider is aware of the problem and is taking steps to fix the problem, including sending technicians to diagnose and repair the problem.

The automated and automatic monitoring of the video quality levels of the telecommunications links by the CPEs obviates the need for sending of technicians to the customer premises to test video quality levels, while allowing for periodic and/or continual monitoring, for upgrading notification and/or diagnosis and repair functionalities.

Figure 2:
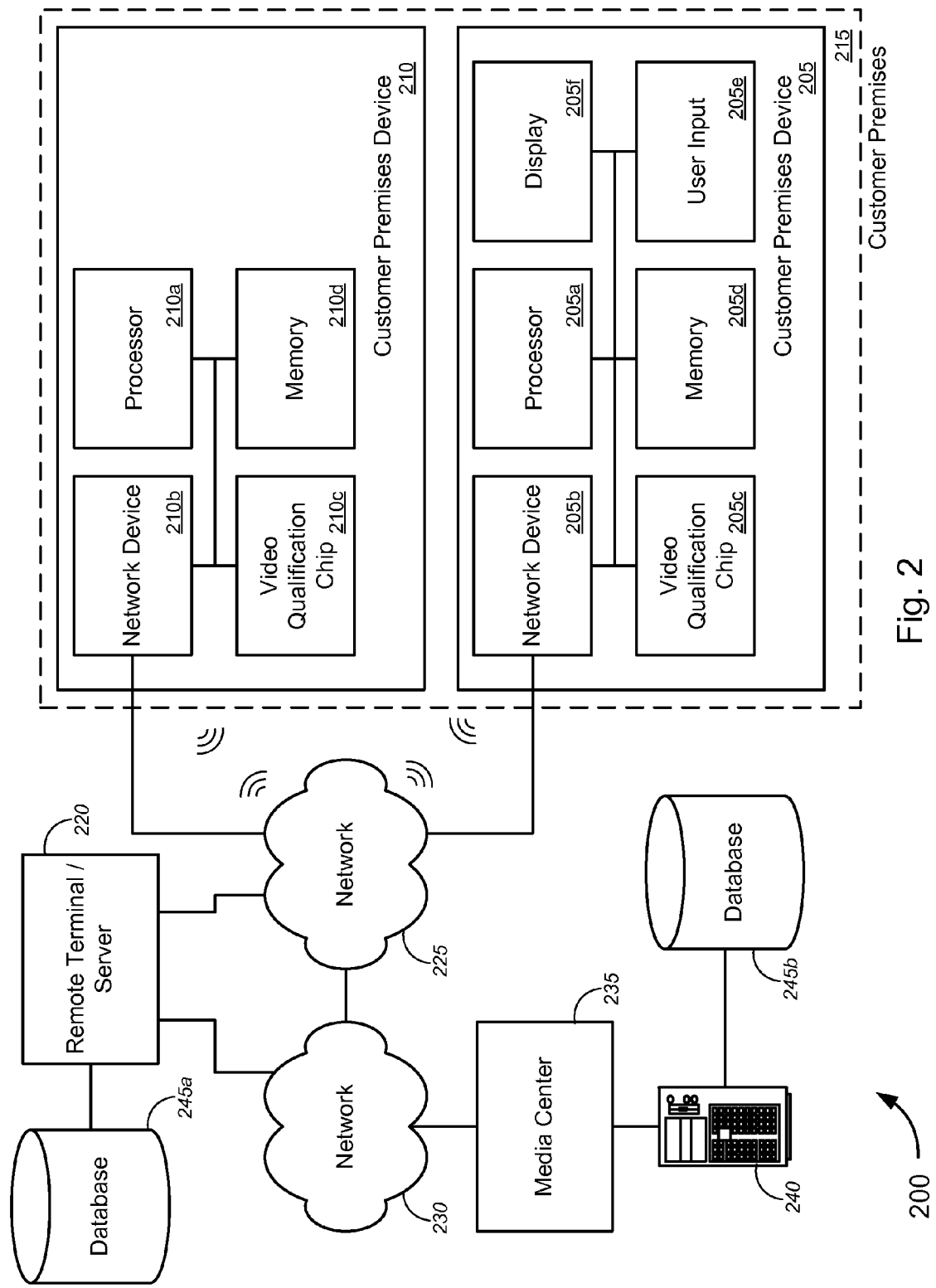
FIG. 2 is a general schematic diagram illustrating another system for implementing video qualification, in accordance with various embodiments.

FIG. 2 is a general schematic diagram illustrating another system 200 for implementing video qualification, in accordance with various embodiments. In FIG. 2, system 200 might comprise one or more first customer premises devices 205 and/or one or more second customer premises devices 210, each of which might be located at or in customer premises 215. Some customer premises devices 205 and/or 210 (including, without limitation, a NID, an ONT, and/or an RG, or the like, such as NID 115, ONT 120, and/or RG 125, respectively as shown and described above with respect to FIG. 1) might be mounted to an exterior wall of the customer premises 215 (e.g., in weather-proof containers). System 200 might further comprise remote terminal or server 220, network 225, network 230, media center 235, media content server 240, and databases 245a and 245b, which might generally correspond to remote terminal or server 140, network 145, network 155, media center 160, media content server 170, and databases 175a and 175b as shown and described above with respect to FIG. 1.

The one or more first customer premises devices 205 might each comprise a processor 205a, a network device 205b, a video qualification chip 205c, memory 205d, a user input device 205e, and/or a display 205f, while the one or more second customer premises devices 210 might each comprise a processor 210a, a network device 210b, a video qualification chip 210c, and/or memory 210d. The one or more first customer premises devices 205, in some embodiments, might include any combination of user devices (including, but not limited to, gaming console 130a, DVR 130b, STB 130c, the one or more TVs 130d-130g, desktop computer 130h, laptop computer 130i, the one or more tablet computers 135a, the one or more smart phones 135b, the one or more mobile phones 135c, or the one or more portable gaming devices 135d, or the like, as shown and described in detail above with respect to FIG. 1). The one or more second customer premises devices 210, in some instances, might include any combination of a NID, an ONT, and/or an RG (including, but not limited to, NID 115, ONT 120, and/or RG 125, respectively, as shown and described with respect to FIG. 1).

The network devices 205b and 210b may each be embodied as one or more transceivers, as one or more pairs of separate transmitters and receivers, or as one or more separate and unpaired transmitters and receivers, network interface cards, or the like. The network devices 205b and 210b might be configured to communicate with network 225 either wirelessly and/or via wired connection. The one or more displays 120 might include one or more touchscreen displays, one or more non-touchscreen displays, or a combination of touchscreen and non-touchscreen displays. The user input devices 205e might include, without limitation, a built-in or external keypad or keyboard, a mouse, a remote control device (e.g., an Infrared ("IR") remote controller, a Bluetooth™-based remote controller, a non-Bluetooth™ wireless (e.g., WIFI) remote controller, or the like), or any other suitable user input device. In some cases, one or more mobile user devices (including, without limitation, a tablet computer, a smart phone, a mobile phone, a portable gaming device, or the like) might be used as a user input device for (and external to) the one or more first customer premises devices 205.

The video qualification chips 205c and 210c may each be configured to monitor and measure the quality of data received, as well as the quality of data transmission, at the customer premises 215, which might include monitoring and measuring signal-to-noise ratios ("SNR"), bit-error-rates ("BER"), mean-opinion scores ("MOS"), simulated MOS, bandwidth to a user device within a local area network ("LAN") within customer premises 215, and/or bandwidth between the LAN and the networks 225 and/or 230, or the like. The measurements and data gathered by at least one of the one or more first customer premises devices 205 or the one or more second customer premises devices 210 are then sent to the remote terminal 220 via network 225 either wirelessly or via wired connections, or both.

The embodiment 200 of FIG. 2 might otherwise operate in a similar, if not identical, manner—with similar, if not identical, functionality and/or components—as embodiment 100 as described in detail above with respect to FIG. 1.

Although the embodiments described above with respect to FIGS. 1 and 2 are directed to existing customers of a service provider, the various embodiments are not so limited. With the use of video qualification chips 210c in most, if not all, customer premises devices 205 and 210 (or CPEs 105), including in customer premises devices or CPEs of non-customer users, video quality levels that a potential customer's premises (or the communications links between the potential customer's premises and the media distribution center associated with a service provider) might be periodically tested. If it is determined that the potential customer's premises qualify for particular video services, the service provider or a third party (e.g., a clearinghouse, a promotions entity, or the like) might send notifications to known user devices of the potential customer to indicate that they (or their premises) qualify for particular video services, the notification including links to more information about the particular video services and more information about how to subscribe. In some cases, automatic ads may be generated that provide pre-approved discounts or promotional deals for the potential customers if they should choose to begin subscription of one or more of the particular video services.

Figure 3:
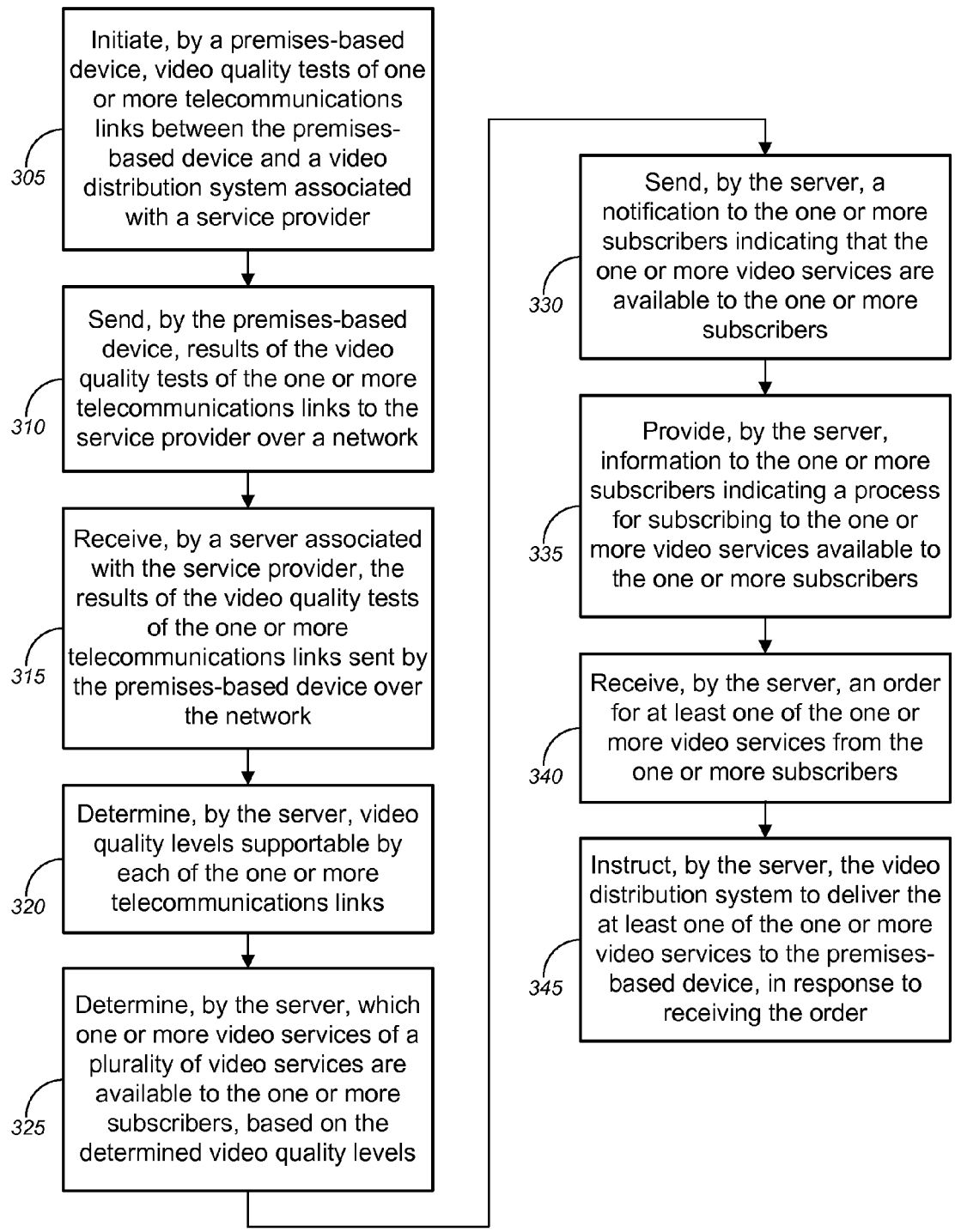
FIG. 3 is a general schematic flow diagram illustrating a method for implementing video qualification and delivering video services, in accordance with various embodiments.
Figures 4A, 4B:
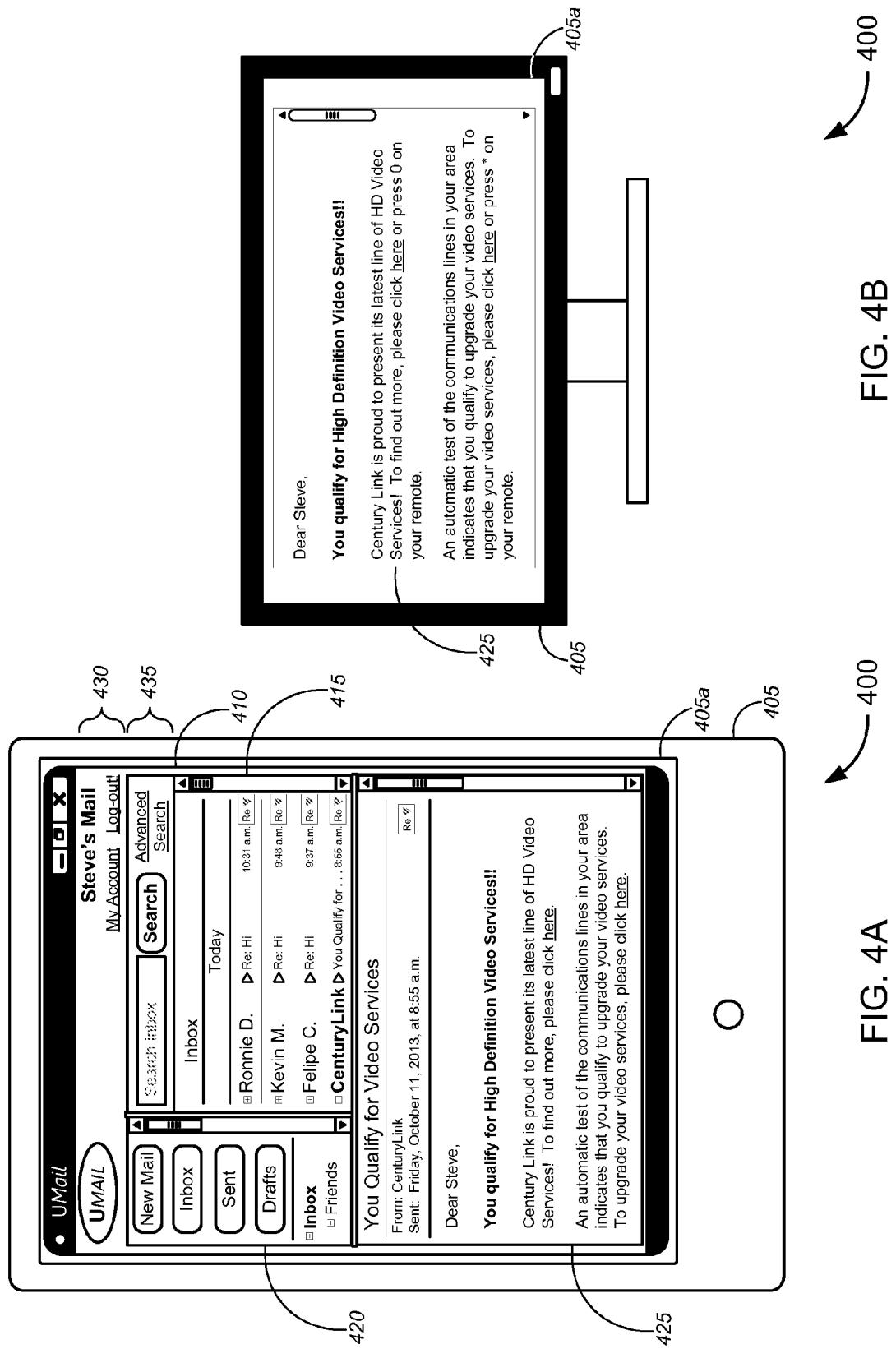
FIGS. 4A and 4B are illustrations of user devices used by users that present exemplary graphical user interfaces for notifying users that they qualify for video services, in accordance with various embodiments.

We now turn to FIGS. 3, 4A, and 4B, which are directed to monitoring communications links to a customer premises and notifying a user associated with the customer premises as to whether and which video services are available to the user at the customer premises. FIG. 3 is a general schematic flow diagram illustrating a method 300 for implementing video qualification and delivering video services, in accordance with various embodiments. FIGS. 4A and 4B (collectively, "FIG. 4") are illustrations of user devices used by users that present exemplary graphical user interfaces for notifying users that they qualify for video services, in accordance with various embodiments.

In FIG. 3, method 300 might comprise, at block 305, initiating, by a premises-based device (e.g., one or more of CPE 105 or customer premises devices 205 and/or 210 as shown and described with respect to FIGS. 1 and 2), video quality tests of one or more telecommunications links between the premises-based device and a video distribution system (e.g., media center 160 or 235 shown in FIGS. 1 and 2) that is associated with a service provider. The video quality tests might include monitoring and measuring one or more of signal-to-noise ratios ("SNR"), bit-error-rates ("BER"), mean-opinion scores ("MOS"), simulated MOS, bandwidth to a user device within a local area network ("LAN") within the customer premises, or bandwidth between the LAN and various networks (e.g., networks 145, 155, 225, and/or 230), and the like.

At block 310, method 300 might comprise sending, by the premises-based device, results of the video quality tests of the one or more telecommunications links to the service provider over a network (e.g., one or more of network 145, 155, 225, or 230 shown in FIGS. 1 and 2). Method 300 might further comprise receiving, by a server associated with the service provider (e.g., remote terminal or server 140 or 220), the results of the video quality tests of the one or more telecommunications links sent by the premises-based device over the network (block 315). The server might (at block 320) determine video quality levels (e.g., DTV, HDTV, and/or UHDTV levels, or the specific line resolutions (e.g., 480, 720, 1080, 2000, 2160, 2540, 4000, or 4320 line resolution, etc.) associated with each of these levels, or the like) supportable by each of the one or more telecommunications links, and might (at block 325) determine which one or more video services of a plurality of video services (including, but not limited to, 480 DTV, 720 or 1080 HDTV, and/or 2000, 2160, 2540, 4000, or 4320 UHDTV video services, etc.) are available to the one or more subscribers, based on the determined video quality levels (determined at block 320).

At block 330, the method 300 might comprise, sending, by the server, a notification to the one or more subscribers indicating that one or more video services are available to the one or more subscribers. Method 300, at block 335, might comprise providing, by the server, information to the one or more subscribers indicating a process for subscribing to the one or more video services available to the one or more subscribers (which might include upgrading to a higher level video service (e.g., HDTV or UHDTV, etc.)).

Method 300 might further comprise, at block 340, receiving, by the server, an order for at least one of the one or more video services from the one or more subscribers. At block 345, method 300 might comprise instructing, by the server, the video distribution system to deliver the at least one of the one or more video services to the premises-based device, in response to receiving the order from the one or more subscribers.

In FIG. 4, although user devices 400 are shown as a tablet computer (FIG. 4A) and a TV (FIG. 4B), the various embodiments are not so limited, and user devices 400 might be any suitable user device comprising, without limitation, a gaming console, a DVR, an STB, an HDTV, an IPTV, a cable TV, a desktop computer, a laptop computer, a smart phone, a mobile phone, a portable gaming device, other suitable user devices, or any combination of these user devices.

User device 400 might comprise device housing 405, a display screen 405a, and the like. In some embodiments, display screen 405a might comprise a touchscreen display, a non-touchscreen display, or the like. Displayed on the display screen 405a might be a graphical user interface ("GUI") 410, which may be a free floating GUI window filling a portion of the display screen 405a or may be a software application that fills the entire display screen 405a. In some cases, the GUI 410 might comprise a window that might be divided into two or more panels 415, 420, and 425, e.g., by using a split screen arrangement or a separate window arrangement (which might stack or tile the separate windows). Alternatively, the two or more panels 415, 420, and 425 might be independent windows or related but separate windows. In the example of FIG. 4A, GUI 410 might be a GUI for an electronic mail (i.e., e-mail) software application (in this example, "UMail"). GUI 410 might comprise a header portion 430, which might include a logo for the e-mail software application (in this case, "UMail"), a welcome notice for the user (who in this example has logged into the e-mail account), a link for the user to edit profiles, options, or otherwise manage his or her account ("My Account" link), and an option to log out of the e-mail account. GUI 410 might further comprise a search bar or search field 435, which might comprise an input search field, a search command button or link, and an option to access advanced search options (including, but not limited to, searching the user's e-mail by one or more of keywords, recipients, senders, dates or date ranges, or the like etc.).

In this case, an e-mail from the user's service provider might have been received by the user, the e-mail notifying the user that the user has qualified for high definition video services. The e-mail might include links or options within the e-mail to learn more about the video services available to the user, as well as links or options for upgrading to one or more of the available video services.

FIG. 4B shows a slightly different implementation of the notification as shown and described with respect to FIG. 4A. In FIG. 4B, the notification might be in the form of an overlay or replacement screen or an electronic program guide panel 425 that displays the notification of the user qualifying for HD video services. Because the notification is presented on a television set, the ability for the user to interact with the notification is via a remote control unit or remote controller. As such, the system might be configured to appropriately perform the functions of invoking an information screen(s) regarding the available video services and/or invoking a subscription screen(s) for upgrading to one or more of the available video services in response to one or more of arrow buttons, an enter button, numerical keypads, or other function buttons entered by the user on a remote controller.

Figure 5:
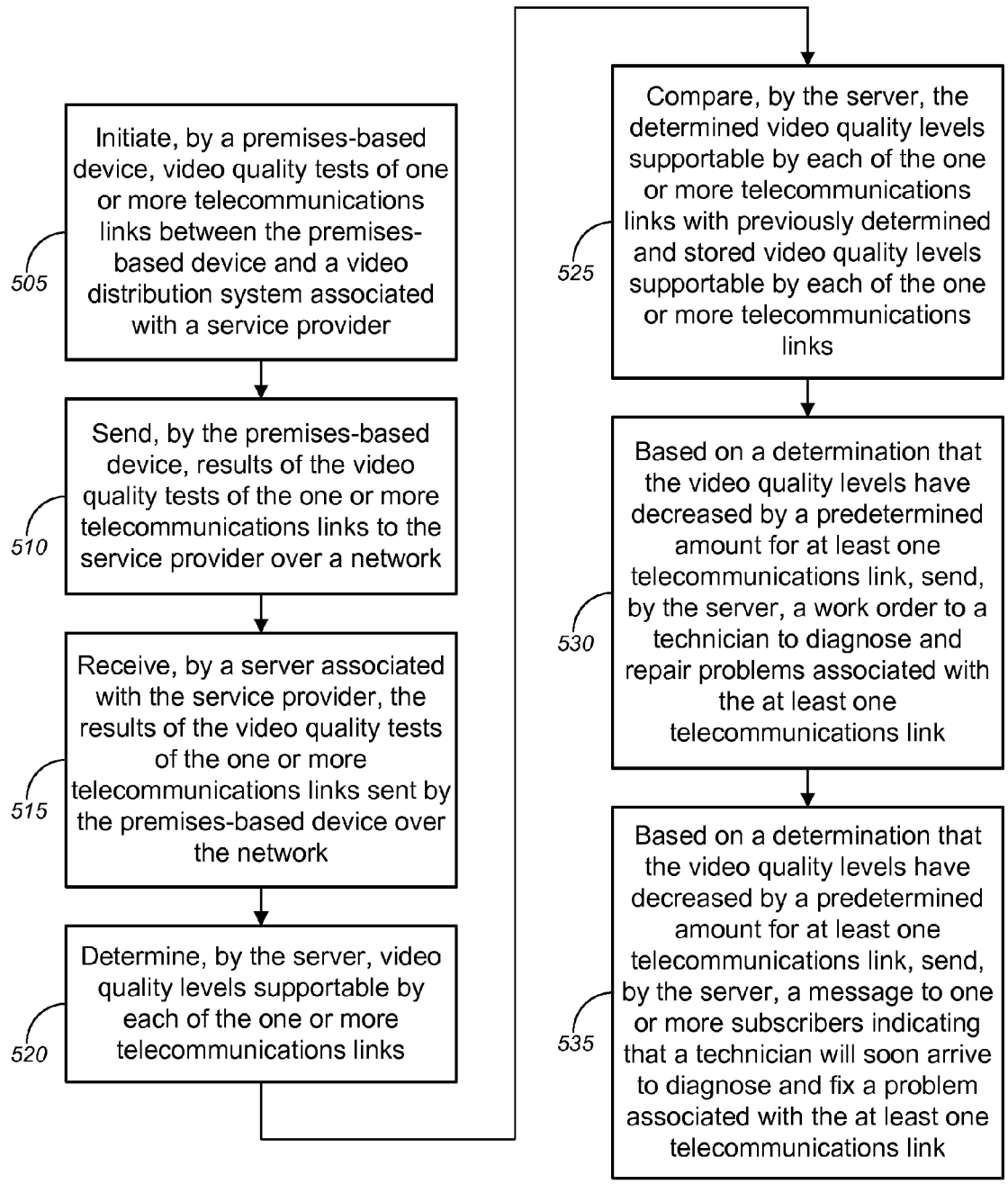
FIG. 5 is a general schematic flow diagram illustrating a method for implementing video qualification and notifying users that a technician has been sent to diagnose and fix a problem associated with the user's video services, in accordance with various embodiments.
Figure 6:
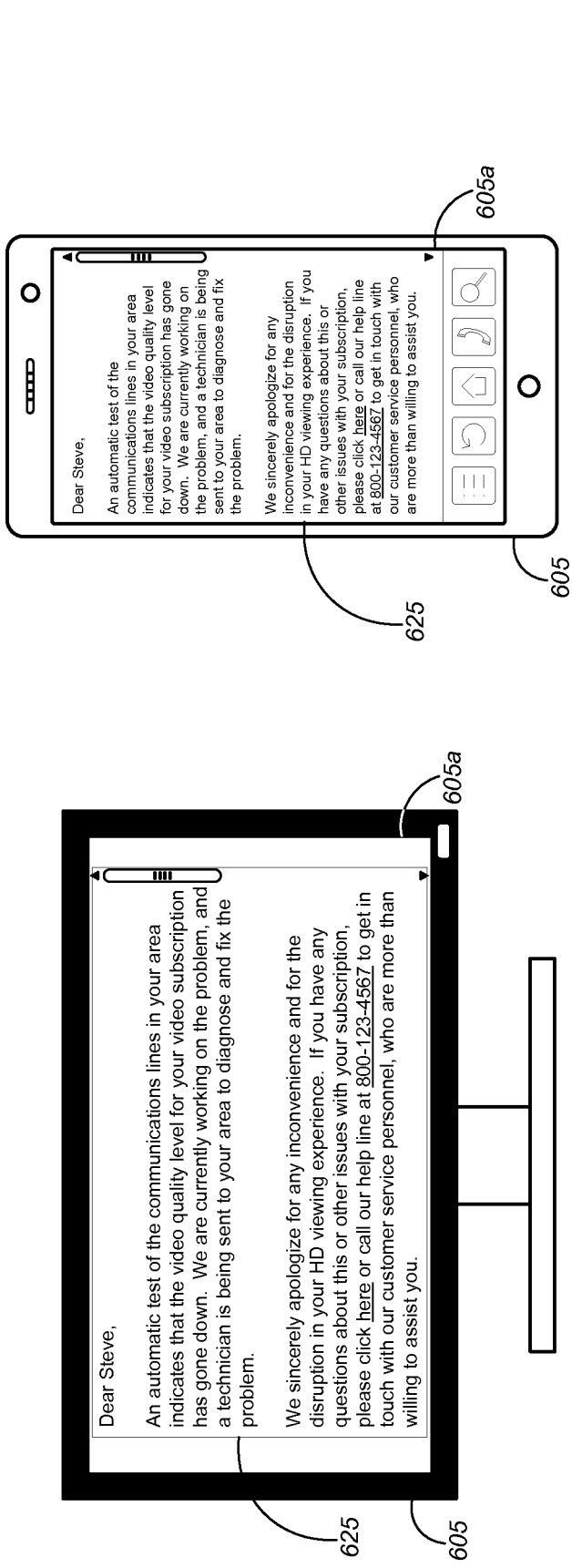
FIGS. 6A and 6B are illustrations of user devices used by users that present exemplary graphical user interfaces for notifying users that a technician has been sent to diagnose and fix a problem associated with the user's video services, in accordance with various embodiments.

With reference to FIGS. 5, 6A, and 6B, these figures are directed to monitoring communications links to a customer premises, determining that the video service levels have decreased, and notifying a user associated with the customer premises that the problem has been noted and that it is being diagnosed and will soon be fixed. FIG. 5 is a general schematic flow diagram illustrating a method 500 for implementing video qualification and notifying users that a technician has been sent to diagnose and fix a problem associated with the user's video services, in accordance with various embodiments. FIGS. 6A and 6B (collectively, "FIG. 6") are illustrations of user devices 600 used by users that present exemplary graphical user interfaces for notifying users that a technician has been sent (or is being sent) to diagnose and fix a problem associated with the user's video services, in accordance with various embodiments.

In FIG. 5, method 500 might comprise, at block 505, initiating, by a premises-based device (e.g., one or more of CPE 105 or customer premises devices 205 and/or 210 as shown and described with respect to FIGS. 1 and 2), video quality tests of one or more telecommunications links between the premises-based device and a video distribution system (e.g., media center 160 or 235 shown in FIGS. 1 and 2) that is associated with a service provider. The video quality tests might include monitoring and measuring one or more of signal-to-noise ratios ("SNR"), bit-error-rates ("BER"), mean-opinion scores ("MOS"), simulated MOS, bandwidth to a user device within a local area network ("LAN") within the customer premises, or bandwidth between the LAN and various networks (e.g., networks 145, 155, 225, and/or 230), and the like.

At block 510, method 500 might comprise sending, by the premises-based device, results of the video quality tests of the one or more telecommunications links to the service provider over a network (e.g., one or more of network 145, 155, 225, or 230 shown in FIGS. 1 and 2). Method 500 might further comprise receiving, by a server associated with the service provider (e.g., remote terminal or server 140 or 220) the results of the video quality tests of the one or more telecommunications links sent by the premises-based device over the network (block 515). The server might (at block 520) determine video quality levels (e.g., DTV, HDTV, and/or UHDTV levels, or the specific line resolutions (e.g., 480, 720, 1080, 2000, 2160, 2540, 4000, or 4320 line resolution, etc.) associated with each of these levels, or the like) supportable by each of the one or more telecommunications links.

The method 500 might comprise comparing, with the server, the determined video quality levels supportable by each of the one or more telecommunications links with previously determined and stored video quality levels supportable by the corresponding one of the one or more telecommunications links (block 525). Based on a determination that the video quality levels have decreased by a predetermined amount (e.g., 5, 10, 15, 20, 25, 30, 50% decrease in video quality level, etc., which in some cases might correspond to a similar increase in error rates or noise levels, or the like) for at least one telecommunications link, method 500 might comprise (at block 530) sending, by the server, a work order to a technician to diagnose and repair problems associated with the at least one telecommunications link, and/or might comprise (at block 535) sending, by the server, a message to one or more subscribers indicating that a technician will soon arrive to diagnose and fix a problem associated with the at least one telecommunications link.

In FIG. 6, although user devices 600 are shown as a TV (FIG. 6A) and a smart phone (FIG. 6B), the various embodiments are not so limited, and user devices 600 might be any suitable user device comprising, without limitation, a gaming console, a DVR, an STB, an HDTV, an IPTV, a cable TV, a desktop computer, a laptop computer, a tablet computer, a mobile phone, a portable gaming device, other suitable user devices, or any combination of these user devices.

User device 600 might comprise device housing 605, a display screen 605a, and the like. In some embodiments, display screen 605a might comprise a touchscreen display, a non-touchscreen display, or the like. In the examples of FIG. 6, a panel 625 of a graphical user interface ("GUI") might present a message or notification from the service provider to the user indicating that the service provider has determined that the video quality level for the user's video subscription has decreased or otherwise been negatively affected, and that the service provider is currently working on the problem, and that a technician is being sent to the user's area to diagnose and fix the problem. The message might also include options for the user to contact the service provider for more information about the subject problem or other issues with the services provided by the service provider to the user. Although not shown, another message might be sent to the service provider and/or the technician to indicate the location of the user/subscriber.

Figure 7:
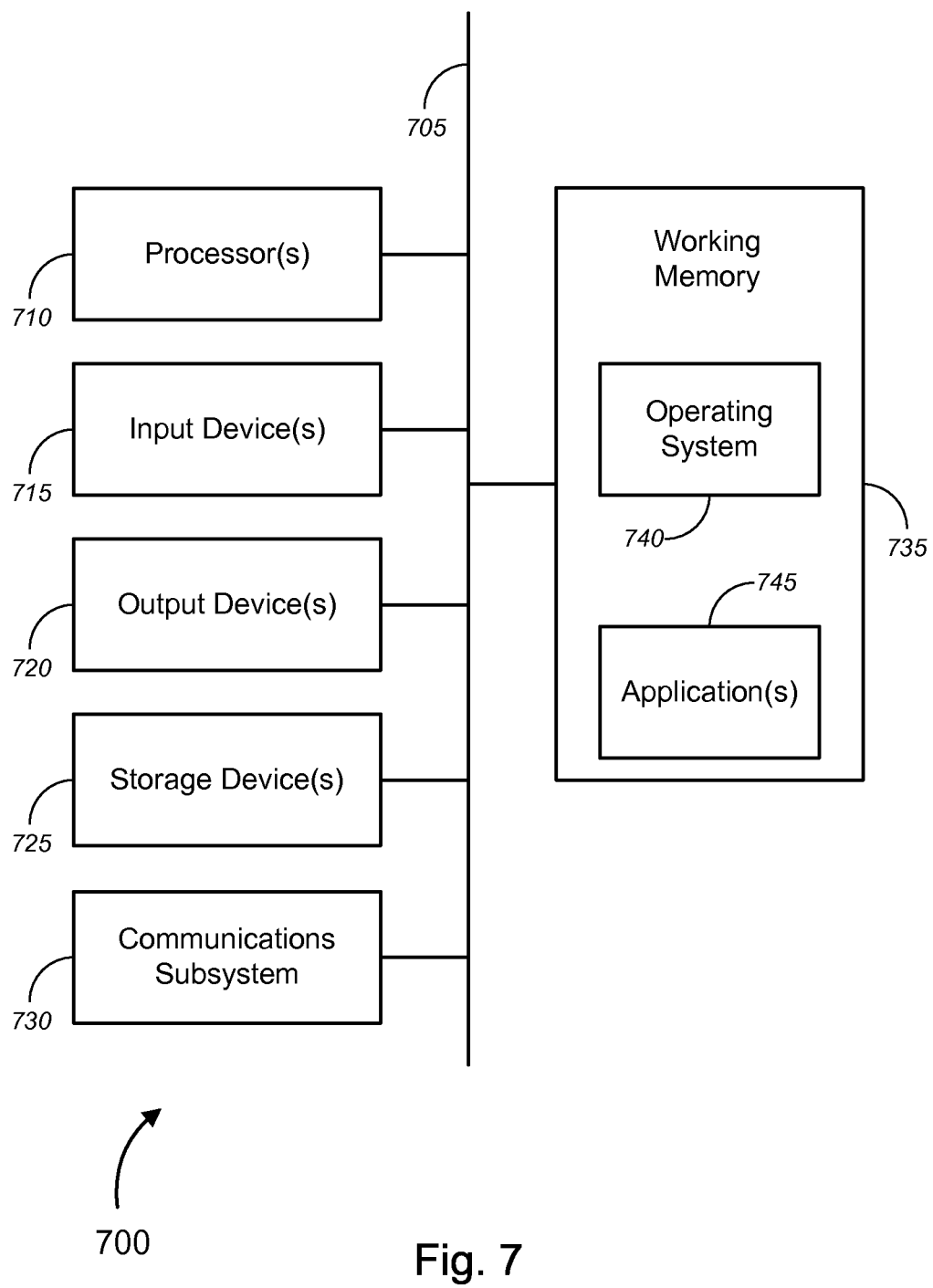
FIG. 7 is a block diagram illustrating an exemplary computer architecture, in accordance with various embodiments.

We now turn to FIG. 7, which is a block diagram illustrating an exemplary computer architecture. FIG. 7 provides a schematic illustration of one embodiment of a computer system 700 that can perform the methods provided by various other embodiments, as described herein, and/or can perform the functions of local computer system 130, 135, 205, or 210, or remote computer system 140, 160, 170, 220, 235, or 240, or other computer systems as described above. It should be noted that FIG. 7 is meant only to provide a generalized illustration of various components, of which one or more, or none, of each may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705, or may otherwise be in communication, as appropriate. The hardware elements may include one or more processors 710, including without limitation one or more general-purpose processors, or one or more special-purpose processors such as digital signal processing chips, graphics acceleration processors, or the like; one or more input devices 715, which can include without limitation a mouse, a keyboard, or the like; and one or more output devices 720, which can include without limitation a display device, a printer, or the like.

The computer system 700 may further include, or be in communication with, one or more storage devices 725. The one or more storage devices 725 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 700 might also include a communications subsystem 730, which can include without limitation a modem, a network card (wireless or wired), an infra-red communication device, a wireless communication device or chipset, or the like. The wireless communication device might include, but is not limited to, a Bluetooth™ device, an 802.11 device, a WiFi device, a WiMax device, a WWAN device, cellular communication facilities, or the like.

The communications subsystem 730 may permit data to be exchanged with a network (such as network 145, 155, 225, or 230, to name examples), with other computer systems, with any other devices described herein, or with any combination of network, systems, and devices. According to some embodiments, network 145 (as well as network 155, 225, or 230) might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 700 will further comprise a working memory 735, which can include a RAM or ROM device, as described above.

The computer system 700 may also comprise software elements, shown as being currently located within the working memory 735, including an operating system 740, device drivers, executable libraries, or other code. The software elements may include one or more application programs 745, which may comprise computer programs provided by various embodiments, or may be designed to implement methods and/or configure systems provided by other embodiments, as described herein. Merely by way of example, one or more procedures described with respect to the methods discussed above might be implemented as code or instructions executable by a computer or by a processor within a computer. In an aspect, such code or instructions can be used to configure or adapt a general purpose computer, or other device, to perform one or more operations in accordance with the described methods.

A set of these instructions or code might be encoded and/or stored on a non-transitory computer readable storage medium, such as the storage devices 725 described above. In some cases, the storage medium might be incorporated within a computer system, such as the system 700. In other embodiments, the storage medium might be separate from a computer system—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 700, or might take the form of source or installable code. The source or installable code, upon compilation, installation, or both compilation and installation, on the computer system 700 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system, such as the computer system 700, to perform methods in accordance with various embodiments of the invention. According to a set of embodiments, some or all of the procedures of such methods might be performed by the computer system 700 in response to processor 710 executing one or more sequences of one or more instructions. The one or more instructions might be incorporated into the operating system 740 or other code that may be contained in the working memory 735, such as an application program 745. Such instructions may be read into the working memory 735 from another computer readable medium, such as one or more of the storage devices 725. Merely by way of example, execution of the sequences of instructions contained in the working memory 735 might cause the one or more processors 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions or code to the one or more processors 710 for execution, might be used to store and/or carry such instructions/code such as signals, or both. In many implementations, a computer readable medium is a non-transitory, physical, or tangible storage medium. Such a medium may take many forms, including, but not limited to, non-volatile media, volatile media, and transmission media. Non-volatile media includes, for example, optical disks, magnetic disks, or both, such as the storage devices 725. Volatile media includes, without limitation, dynamic memory, such as the working memory 735. Transmission media includes, without limitation, coaxial cables, copper wire and fiber optics, including the wires that comprise the bus 705, as well as the various components of the communication subsystem 730, or the media by which the communications subsystem 730 provides communication with other devices. Hence, transmission media can also take the form of waves, including without limitation radio, acoustic, or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium with patterns of holes; a RAM, a PROM, an EPROM, a FLASH-EPROM, or any other memory chip or cartridge; a carrier wave; or any other medium from which a computer can read instructions or code.

Figure 8:
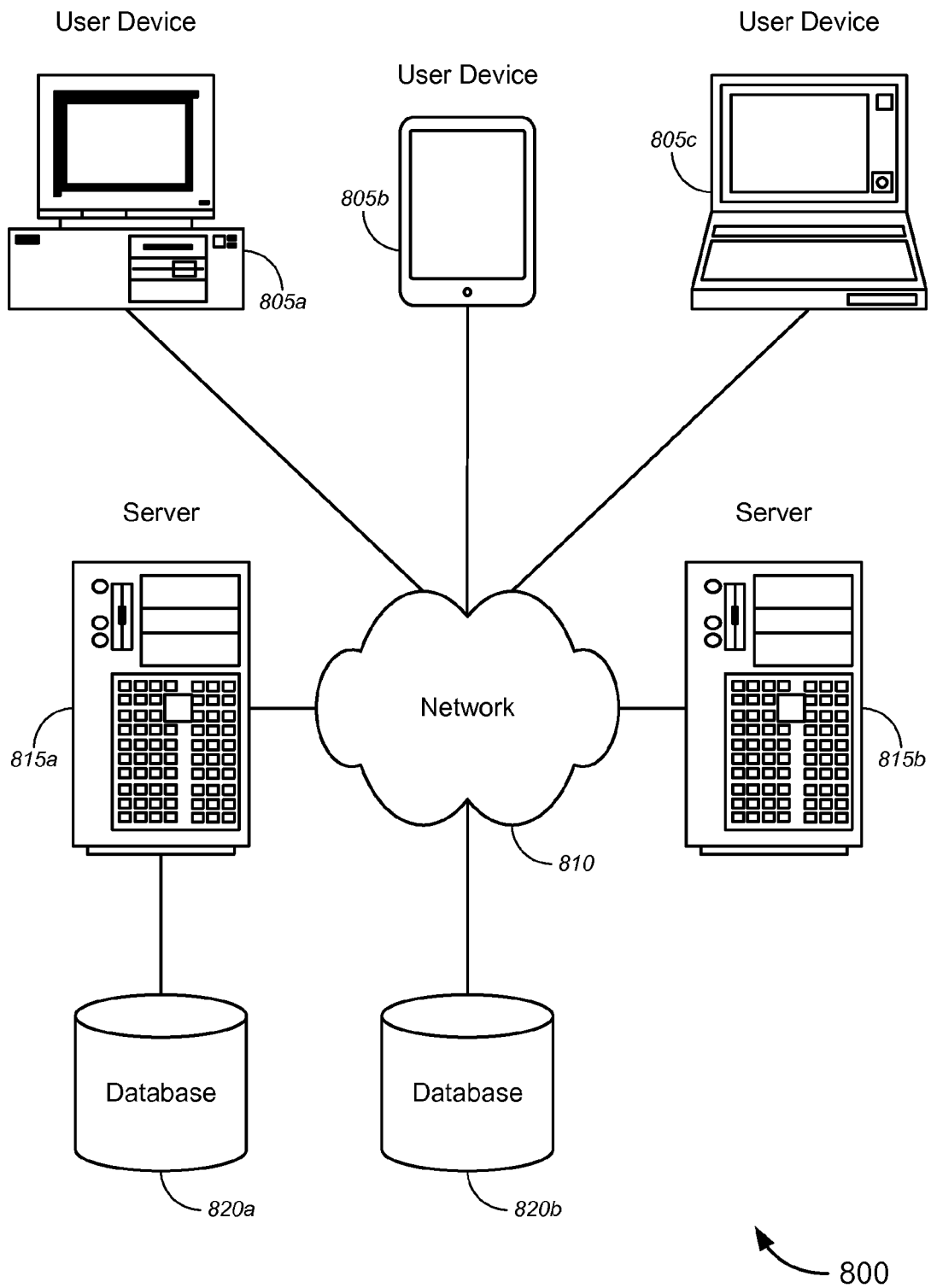
FIG. 8 is a block diagram illustrating a networked system of computers, which can be used in accordance with various embodiments.

As noted above, a set of embodiments comprises methods and systems for implementing video qualification and/or implementing video quality measurements at a customer premises and qualification of the customer premises for particular levels of video data transmission. FIG. 8 illustrates a schematic diagram of a system 800 that can be used in accordance with one set of embodiments. The system 800 can include one or more user computers or user devices 805. A user computer or user device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer or user device 805 can also have any of a variety of applications, including one or more applications configured to perform methods provided by various embodiments (as described above, for example), as well as one or more office applications, database client and/or server applications, and/or web browser applications. Alternatively, a user computer or user device 805 can be any other electronic device, such as a thin-client computer, Internet-enabled mobile telephone, and/or personal digital assistant, capable of communicating via a network (e.g., the network 810 described below) and/or of displaying and navigating web pages or other types of electronic documents. Although the exemplary system 800 is shown with three user computers or user devices 805, any number of user computers or user devices can be supported.

Certain embodiments operate in a networked environment, which can include a network 810. The network 810 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 810 can include a local area network ("LAN"), including without limitation a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including without limitation any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer or user device 805 and/or another server 815. In some embodiments, an application server can perform one or more of the processes for implementing automated cloud expansion and ordering, or the like, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer or user device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820. The location of the database(s) 820 is discretionary: merely by way of example, a database 820a might reside on a storage medium local to (and/or resident in) a server 815a (and/or a user computer or user device 805). Alternatively, a database 820b can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for implementing video qualification, the method comprising:
   initiating, by a premises-based device associated with one or more subscribers of a service provider, video quality tests of one or more telecommunications links between the premises-based device and a video distribution system associated with the service provider;
   sending, by the premises-based device, results of the video quality tests of the one or more telecommunications links to the service provider over a network;
   receiving, by a server associated with the service provider, the results of the video quality tests of the one or more telecommunications links sent by the premises-based device over the network;
   determining, by the server, video quality levels supportable by each of the one or more telecommunications links;
   comparing, by the server, the determined video quality levels supportable by each of the one or more telecommunications links with previously determined and stored video quality levels supportable by each of the one or more telecommunications links; and
   based on a determination that the video quality levels have decreased by a predetermined amount for at least one of the one or more telecommunications links, sending, by the server, at least one of a work order to a technician to diagnose and repair problems associated with the at least one of the one or more telecommunications links or a message to the one or more subscribers associated with the premises-based device indicating that a technician will soon arrive to diagnose and fix a problem associated with the at least one of the one or more telecommunications links.

2. The method of claim 1, wherein the premises-based device comprises one or more of at least one user device, a modem, a residential gateway device, a network interface device ("NID"), or an optical network terminal ("ONT").

3. The method of claim 2, wherein the at least one user device comprises one or more devices selected from a group consisting of a tablet computer, a smart phone, a mobile phone, a gaming console, a portable gaming system, a desktop computer, a laptop computer, a television set, a set top box, and a portable video playback device.

4. The method of claim 1, wherein the video quality tests comprise one or more of a signal-to-noise ratio ("SNR") test, a bit error rate ("BER") test, a bandwidth test, or a simulated mean opinion score ("MOS") test.

5. The method of claim 1, further comprising:
   sending, by the server, a notification to the one or more subscribers associated with the premises-based device indicating that one or more video services are available to the one or more subscribers, by sending the notification to the premises-based device; and
   providing, by the server, information to the one or more subscribers indicating a process for subscribing to the one or more video services available to the one or more subscribers, by sending the information to the premises-based device.

6. The method of claim 1, further comprising:
   sending, by the server, at least one message to the service provider indicating that a corresponding location associated with each of the one or more subscribers qualifies for one or more video services, based on the determined video quality levels supportable by each of the one or more telecommunications links.

7. The method of claim 6, further comprising:
   receiving, by the server, an order, from the one or more subscribers, for at least one of the one or more video services; and
   instructing, by the server, the video distribution system to deliver the at least one of the one or more video services to the premises-based device associated with the one or more subscribers, in response to receiving the order.

8. A system for implementing video qualification, the system comprising:
   a premises-based device associated with one or more subscribers of a service provider, the premises-based device comprising one or more first processors configured to:
      initiate video quality tests of one or more telecommunications links between the premises-based device and a video distribution system associated with the service provider; and
      send results of the video quality tests of the one or more telecommunications links to the service provider over a network; and
   a server associated with the service provider, the server comprising one or more second processors configured to:

receive the results of the video quality tests of the one or more telecommunications links sent by the one or more first processors of the premises-based device over the network;

determine video quality levels supportable by each of the one or more telecommunications links;

compare the determined video quality levels supportable by each of the one or more telecommunications links with previously determined and stored video quality levels supportable by each of the one or more telecommunications links; and based on a determination that the video quality levels have decreased by a predetermined amount for at least one of the one or more telecommunications links, send at least one of a work order to a technician to diagnose and repair problems associated with the at least one of the one or more telecommunications links or a message to one or more subscribers associated with the premises-based device indicating that a technician will soon arrive to diagnose and fix a problem associated with the at least one of the one or more telecommunications links.

9. The system of claim 8, wherein the premises-based device comprises one or more of at least one user device, a modem, a residential gateway device, a network interface device ("NID"), or an optical network terminal ("ONT").

10. The system of claim 9, wherein the at least one user device comprises one or more devices selected from a group consisting of a tablet computer, a smart phone, a mobile phone, a gaming console, a portable gaming system, a desktop computer, a laptop computer, a television set, a set top box, and a portable video playback device.

11. The system of claim 8, wherein the video quality tests comprise one or more of a signal-to-noise ratio ("SNR") test, a bit error rate ("BER") test, a bandwidth test, or a simulated mean opinion score ("MOS") test.

12. The system of claim 8, wherein the one or more second processors are configured to send the notification to the one or more subscribers associated with the premises-based device indicating that the one or more video services are available to the one or more subscribers, by sending the notification to the premises-based device, and wherein the one or more second processors are configured to provide the information to the one or more subscribers indicating the process for subscribing to the one or more video services available to the one or more subscribers, by sending the information to the premises-based device.

13. The system of claim 8, wherein the one or more second processors of the server are further configured to:
send at least one message to the service provider indicating that a corresponding location associated with each of the one or more subscribers qualifies for one or more video services, based on the determined video quality levels supportable by each of the one or more telecommunications links.

14. The system of claim 13, wherein the one or more second processors of the server are further configured to:
receive an order, from the one or more subscribers, for at least one of the one or more video services; and
instruct the video distribution system to deliver the at least one of the one or more video services to the premises-based device associated with the one or more subscribers, in response to receiving the order.

15. An apparatus for implementing video qualification, the apparatus comprising:
one or more processors;
a non-transitory computer readable medium having stored thereon software comprising a set of instructions that, when executed by the one or more processors, causes the apparatus to perform one or more functions, the set of instructions comprising:
instructions to receive results of video quality tests of one or more telecommunications links between a premises-based device associated with one or more subscribers of a service provider and a video distribution system associated with the service provider;
instructions to determine video quality levels supportable by each of the one or more telecommunications links;
instructions to compare the determined video quality levels supportable by each of the one or more telecommunications links with previously determined and stored video quality levels supportable by each of the one or more telecommunications links; and
instructions to, based on a determination that the video quality levels have decreased by a predetermined amount for at least one of the one or more telecommunications links, send at least one of a work order to a technician to diagnose and repair problems associated with the at least one of the one or more telecommunications links or a message to one or more subscribers associated with the premises-based device indicating that a technician will soon arrive to diagnose and fix a problem associated with the at least one of the one or more telecommunications links.

16. The apparatus of claim 15, wherein the set of instructions further comprises:
instructions to receive an order, from the one or more subscribers, for at least one of one or more video services that are determined to be available to the one or more subscribers based on the determined video quality levels supportable by each of the one or more telecommunications links; and
instructions to instruct the video distribution system to deliver the at least one of the one or more video services to the premises-based device associated with the one or more subscribers, in response to receiving the order.

17. A video quality chip installed in a premises-based device for implementing video qualification, the premises-based device being associated with one or more subscribers of a service provider, the video quality chip comprising:
a processor;
a non-transitory computer readable medium having stored thereon software comprising a set of instructions that, when executed by the processor, causes the premises-based device to perform one or more functions, the set of instructions comprising:
instructions to initiate video quality tests of one or more telecommunications links between the premises-based device and a video distribution system associated with a service provider;
instructions to send results of the video quality tests of the one or more telecommunications links to an apparatus over a network, the apparatus being associated with a service provider;
instructions to compare the determined video quality levels supportable by each of the one or more telecommunications links with previously determined and stored video quality levels supportable by each of the one or more telecommunications links; and
instructions to, based on a determination that the video quality levels have decreased by a predetermined amount for at least one of the one or more telecommunications links, send at least one of a work order to a technician to diagnose and repair problems associated with the at least one of the one or more telecommunications links or a message to one or more subscribers associated with the premises-based device indicating that a technician will soon arrive to diagnose and fix a problem associated with the at least one of the one or more telecommunications links.

* * * * *